(12) United States Patent
Pearson et al.

(10) Patent No.: US 7,172,634 B2
(45) Date of Patent: Feb. 6, 2007

(54) ETHYLENICALLY-UNSATURATED BLUE ANTHRAQUINONE DYES

(75) Inventors: Jason Clay Pearson, Kingsport, TN (US); Max Allen Weaver, Kingsport, TN (US); Jean Carroll Fleischer, Kingsport, TN (US); Greg Alan King, Mount Carmel, TN (US)

(73) Assignee: Eastman Chemical Company, Kingsport, TN (US)

( * ) Notice: Subject to any disclaimer, the term of this patent is extended or adjusted under 35 U.S.C. 154(b) by 74 days.

(21) Appl. No.: 10/647,827

(22) Filed: Aug. 25, 2003

(65) Prior Publication Data

US 2005/0044644 A1    Mar. 3, 2005

(51) Int. Cl.
*C09B 67/00*    (2006.01)

(52) U.S. Cl. .................. 8/527; 8/675; 8/679; 552/241; 552/242; 552/246

(58) Field of Classification Search ............... 552/246, 552/241, 242; 8/527, 675, 679
See application file for complete search history.

(56) References Cited

U.S. PATENT DOCUMENTS

| | | | |
|---|---|---|---|
| 2,641,602 A | 6/1953 | Straley et al. | |
| 2,651,641 A | 9/1953 | Straley et al. | |
| 2,723,279 A | 11/1955 | Hoefle et al. | |
| 2,726,251 A | 12/1955 | Dickey et al. | |
| 2,777,863 A | 1/1957 | Dickey et al. | |
| 2,798,081 A | 7/1957 | Dickey et al. | |
| 2,827,356 A | 3/1958 | Salvin et al. | |
| 2,933,508 A | 4/1960 | Lodge | |
| 2,945,867 A | 7/1960 | Hoefle et al. | |
| 3,759,959 A * | 9/1973 | Peter et al. ............ | 552/246 |
| 4,115,056 A | 9/1978 | Koller et al. | |
| 4,943,617 A | 7/1990 | Etzbach et al. | |
| 5,055,602 A | 10/1991 | Melpolder | |
| 5,109,097 A | 4/1992 | Klun et al. | |
| 5,362,812 A | 11/1994 | Holmes et al. | |
| 5,367,039 A | 11/1994 | Yabuuchi et al. | |
| 5,578,419 A | 11/1996 | Itoh et al. | |

FOREIGN PATENT DOCUMENTS

| | | |
|---|---|---|
| EP | 0 322 808 | 7/1989 |
| EP | 0 323 060 A2 | 7/1989 |
| GB | 1 280 235 | 7/1972 |
| GB | 1 293 557 | 10/1972 |
| WO | WO 96/01283 | 1/1996 |
| WO | WO 97/48744 | 12/1997 |
| WO | WO 02/12401 | 2/2002 |

OTHER PUBLICATIONS

Asquith et al., Journal of the Society of Dyers and Colourists, Apr. 1977, pp. 114-125.
McCallum et al, Environmental Science Technology, vol. 34, No. 24, 2000, pp. 5157-5164.

* cited by examiner

*Primary Examiner*—Eisa Elhilo
(74) *Attorney, Agent, or Firm*—Bernard J. Graves, Jr.; Brett L. Nelson

(57) ABSTRACT

This invention pertains to certain novel colorant compounds containing one or more ethylenically-unsaturated, photopolymerizable radicals that may be copolymerized (or cured) with ethylenically-unsaturated monomers to produce colored compositions such as colored acrylic polymers. Suitable compositions having the present colorants copolymerized therein include, e.g., polymers produced from acrylate and methacrylate esters, colored polystyrenes, and similar colored polymeric materials derived from other ethylenically-unsaturated monomers. The present invention also pertains to processes for preparing the photopolymerizable colorant compounds. The ethylenically unsaturated colorant compounds may be suitable for use in coatings that are applied to wood, glass, metal, thermoplastics and the like.

11 Claims, No Drawings

ETHYLENICALLY-UNSATURATED BLUE ANTHRAQUINONE DYES

FIELD OF THE INVENTION

This invention pertains to novel colorant, or dye, compounds containing one or more ethylenically-unsaturated (e.g., vinyl-containing), photopolymerizable radicals that may be copolymerized (or cured) with ethylenically-unsaturated monomers. The copolymerized colorants produce colored compositions such as colored acrylic polymers, e.g., polymers produced from acrylate and methacrylate esters, colored polystyrenes, and similar colored polymeric materials derived from other ethylenically-unsaturated monomers. The present invention also pertains to processes for preparing the photopolymerizable colorant compounds. The ethylenically unsaturated colorant compounds may be suitable for use in coatings that are applied to wood, glass, metal, thermoplastics and the like.

BACKGROUND

Colored polymeric materials may be produced by combining a reactive polymer, such terepolymers having epoxy groups or polyacryloyl chloride, with anthraquinone dyes containing nucleophilic reactive groups such as amino or hydroxy groups. Similarly, acryloylaminoanthraquinone dyes may be grafted to the backbone of vinyl or divinyl polymers. Likewise, anthraquinone dyes containing certain olefinic groups have been polymerized to produce polymeric dyes/pigments. (See, e.g., J.S.D.C., April 1977, pp 114–125.)

U.S. Pat. No. 4,115,056 describes the preparation of blue, substituted 1,4-diaminoanthraquinone dyes containing one acryloyloxy group and the use of the dyes in coloring various fibers, especially polyamide fibers. U.S. Pat. No. 4,943,617 discloses liquid crystalline copolymers containing certain blue, substituted 1,5-diamino-4,8-dihydroxyanthraquinone dyes containing an olefinic group copolymerized therein to provide liquid crystal copolymers having high dichromism. U.S. Pat. No. 5,055,602 describes the preparation of certain substituted 1,4-diaminoanthraquinone dyes containing polymerizable acryloyl and methacryloyl groups and their use in coloring polyacrylate contact lens materials by copolymerizing.

U.S. Pat. No. 5,362,812 discloses the conversion of a variety of dye classes, including anthraquinones, into polymeric dyes by (a) polymerizing 2-alkenylazlactones and reacting the polymer with dyes containing nucleophilic groups and by (b) reacting a nucleophilic dye with an alkenylazlactone and then polymerizing the free radically polymerizable dyes thus produced. The polymeric dyes are reported to be useful for photoresist systems and for color proofing. U.S. Pat. No. 5,367,039 discloses a process for preparing colored vinyl polymers suitable for inks, paints, toners and the like by emulsion polymerization of a vinyl monomer with reactive anthraquinone dyes prepared by functionalizing certain anthraquinone dyes with methacryloyl groups.

The preparation of a variety of dyes, including some anthraquinones, that contain photopolymerizable groups and their use for color filters suitable for use in liquid crystal television sets, color copying machines, photosensitive resist resin compositions, and the like are described in U.S. Pat. No. 5,578,419. The preparation of a variety of anthraquinones dyes which contain photopolymerizable groups are disclosed in U.S. patent application Ser. No. 20020068725.

The present invention provides economical, photopolymerizable blue anthraquinone colorants with improved light stability and solubility in solvents or monomers relative to that known in the art. It has been surprisingly discovered that certain coating compositions on certain substrates prepared from the ethylenically-unsaturated blue colorants are harder than identical uncolored coatings on the same substrates.

SUMMARY OF THE INVENTION

The present invention relates to photopolymerizable or free radically polymerizable, blue anthraquinone colorants having the structure in Formula I:

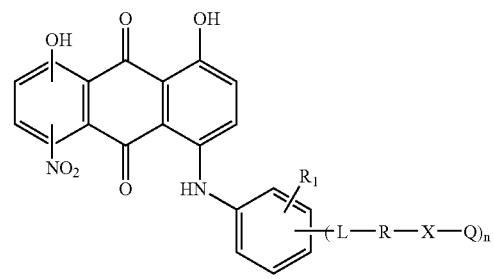

wherein

L is a covalent carbon-carbon bond or a linking group selected from the group consisting of —O—, —S—, —SO$_2$—, —CON(R$_2$)—, —N(COR$_3$)—, —N(R$_2$)CO—, and —N(SO$_2$R$_3$)—;

R is a divalent organic radical selected from the group consisting of C$_1$–C$_6$-alkylene; C$_1$–C$_6$-alkylene-Y—CH$_2$CH$_2$—; and —(CH$_2$CH$_2$—)$_m$—Y—CH$_2$CH$_2$—;

R$_1$ is hydrogen or represents one or two groups selected from the group consisting of C$_1$–C$_6$-alkyl, C$_1$–C$_6$-alkoxy and halogen.

R$_2$ is hydrogen, C$_1$–C$_6$-alkyl, C$_3$–C$_8$-cycloalkyl or aryl;

R$_3$ is C$_1$–C$_6$-alkyl, C$_3$–C$_8$-cycloalkyl or aryl;

X is —O— or —N(R$_2$)—;

Y is —O—, —S—, —SO$_2$—, —N(SO$_2$R$_3$)—, or —N(COR$_3$)—;

n is 1 or 2;

m is 2 or 3; and

Q is an ethylenically-unsaturated photopolymerizable group.

The present invention also relates to a process for making concentrated solutions of the ethylenically-unsaturated photopolymerizable colorants (e.g., dyes) wherein toluene, methylethyl ketone, acetone, hexanediol diacrylate, tri(propyleneglycol) diacrylate and the like are preferred solvents. The concentration of dye in the solution can be from about 0.5 weight percent (wt %) to about 40 wt %.

The present invention further relates to a coating composition containing the photopolymerizable colorants of Formula I. Preferred coating substrates are thermoplastics, glass, wood, paper, metal and the like, particularly preferred thermoplastics are polyesters, acrylics and polycarbonate.

DETAILED DESCRIPTION OF THE INVENTION

The colorants described in the present invention are blue. Thus, the present invention relates to photopolymerizable or free radical polymerizable, blue anthraquinone colorants having the structure in Formula I:

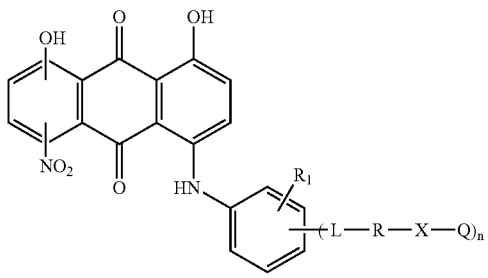

I wherein

L represents a covalent carbon-carbon bond or a linking group selected from the group consisting of —O—, —S—, —SO$_2$—, —CON(R$_2$)—, —N(COR$_3$)—, —N(R$_2$)CO—, and —N(SO$_2$R$_3$)—;

R is a divalent organic radical selected from the group consisting of C$_1$–C$_6$-alkylene; C$_1$–C$_6$-alkylene-Y—CH$_2$CH$_2$—; and —(CH$_2$CH$_2$)$_m$—Y—CH$_2$CH$_2$—;

R$_1$ is hydrogen or represents one or two groups selected from the group consisting of C$_1$–C$_6$-alkyl, C$_1$–C$_6$-alkoxy and halogen.

R$_2$ is hydrogen, C$_1$–C$_6$-alkyl, C$_3$–C$_8$-cycloalkyl or aryl;

R$_3$ is C$_1$–C$_6$-alkyl, C$_3$–C$_8$-cycloalkyl or aryl;

X is —O— or —N(R$_2$)—;

Y is —O—, —S—, —SO$_2$—, —N(SO$_2$R$_3$)—, or —N(COR$_3$)—;

n is 1 or 2;

m is 2 or 3; and

Q is an ethylenically-unsaturated photopolymerizable or free radical initiated polymerizable group.

The phrase "ethylenically-unsaturated photopolymerizable group" and/or "free radical initiated polymerizable group" will be understood to the person of skill in the art to refer to a moiety having a reactive C=C double bond, including those having a vinyl group; preferably, the reactive double bond is activated by being attached to an aryl group or an electron withdrawing group such as a carbonyl. The skilled artisan will understand that "reactive C=C double bond" is not intended to include the endocyclic conjugated double bonds in an aromatic ring since these bonds are known to be unreactive, e.g., to free radical polymerization under normal polymerization conditions.

Preferred Q groups include the following organic radicals 1–9:

—COC(R$_4$)=CH—R$_5$,  1

—CONHCOC(R$_4$)=CH—R$_5$,  2

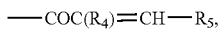  3

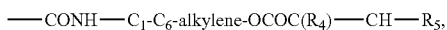

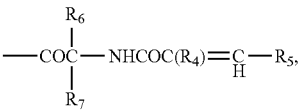  4

—COCH=CH—CO$_2$R$_8$,  5

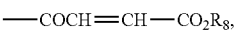  6

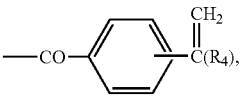  7

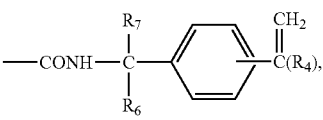  8

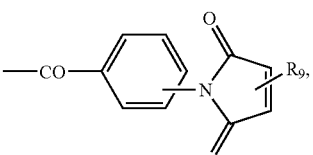  9

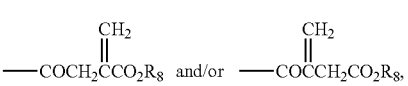

wherein:

R$_4$ is hydrogen or C$_1$–C$_6$-alkyl;

R$_5$ is hydrogen; C$_1$–C$_6$ alkyl; phenyl; phenyl substituted with one or more groups selected from the group consisting of C$_1$–C$_6$-alkyl, C$_1$–C$_6$-alkoxy, —N(C$_1$–C$_6$-alkyl)$_2$, nitro, cyano, C$_1$–C$_6$-alkoxycarbonyl, C$_1$–C$_6$-alkanoyloxy and halogen; 1- or 2-naphthyl; 1- or 2-naphthyl substituted with C$_1$–C$_6$-alkyl or C$_1$–C$_6$-alkoxy; 2- or 3-thienyl; 2- or 3-thienyl substituted with C$_1$–C$_6$-alkyl or halogen; 2- or 3-furyl; or 2- or 3-furyl substituted with C$_1$–C$_6$-alkyl;

R$_6$ and R$_7$ are, independently, hydrogen, C$_1$–C$_6$-alkyl, or aryl; or R$_6$ and R$_7$ may be combined to represent a —(CH$_2$)$_{3-5}$ radical;

R$_8$ is hydrogen, C$_1$–C$_6$-alkyl, C$_1$–C$_8$-alkenyl, C$_3$–C$_8$-cycloalkyl or aryl; and R$_9$ is hydrogen, C$_1$–C$_6$-alkyl or aryl.

The alkyl groups described by the terms "C$_1$–C$_6$-alkyl" and "C$_1$–C$_6$ alkoxy" refer to straight or branched chain hydrocarbon radicals containing one to six carbon atoms. The term "C$_3$–C$_8$-cycloalkyl" refers to a cyclic hydrocarbon radical containing three to eight carbon atoms. The term "aryl" includes phenyl and phenyl substituted with one to three C$_1$–C$_6$-alkyl, C$_1$–C$_6$-alkoxy or halogen groups. The term "C$_1$–C$_6$-alkylene" refers to a straight or branched chain, divalent hydrocarbon radical optionally substituted with hydroxy, halogen, aryl, —OCOC$_1$–C$_6$-alkyl, or —X—Q. The term "halogen" includes fluorine, chlorine, bromine and iodine. The terms "C$_1$–C$_6$-alkoxycarbonyl" and "C$_1$–C$_6$-alkanoyloxy" denote the radicals —CO$_2$C$_1$–C$_6$-alkyl and —O—COC$_1$–C$_6$-alkyl, respectively. The term "C$_3$–C$_8$ alkenyl" denotes a straight or branched chain hydrocarbon radical that contains at least one carbon-carbon double bond.

The skilled artisan will understand that each of the references herein to groups or moieties having a stated range of carbon atoms, such as "C$_1$–C$_6$-alkyl," includes not only the C$_1$ group (methyl) and C$_6$ group (hexyl) end points, but also each of the corresponding individual $C_2$, $C_3$, $C_4$ and $C_5$ groups. In addition, it will be understood that each of the individual points within a stated range of carbon atoms may be further combined to describe subranges that are inherently within the stated overall range. For example, the term "$C_3$–$C_8$-cycloalkyl" includes not only the individual cyclic moieties $C_3$ through $C_8$, but also contemplates subranges such as "$C_4$–$C_6$-cycloalkyl."

A preferred embodiment of the present invention is colorants of Formula I are those where R is $C_1$–$C_4$-alkylene, $R_1$ is hydrogen, L is oxygen or a covalent bond, X is oxygen and Q is

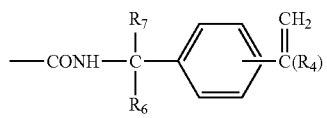

(i.e., radical 7, above) wherein $R_4$ is hydrogen or methyl; $R_6$ and $R_7$ are methyl; and n is 1. A further preferred embodiment are colorants of Formula I where R is $C_1$–$C_4$-alkylene, $R_1$ is hydrogen, L is oxygen or a covalent bond, X is oxygen and Q is

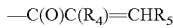

(i.e., radical 1, above) wherein $R_4$ is hydrogen or methyl; $R_5$ is hydrogen; and n is 1.

The colorants of Formula I may be prepared by reacting 4,8-dinitroanthrarufin, 4,5-dinitrochrysazin or a mixture thereof with the appropriate aromatic amine of Formula II to give the intermediate of Formula III, which may then be further reacted with the desired reagents to introduce Q groups 1–9 above:

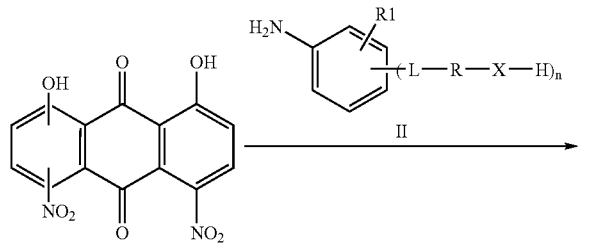

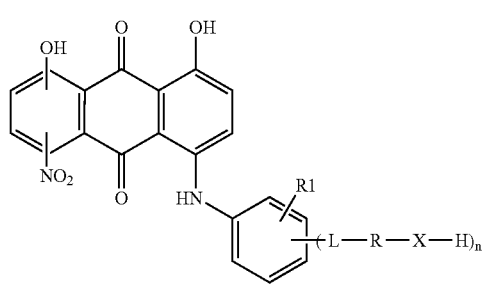

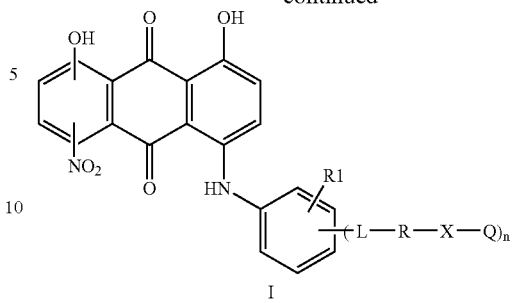

I

Compounds of intermediate Formula III are known to be useful as disperse dyes for cellulose acetate and polyesters and may be prepared by procedures known to those skilled in the art. (See, e.g., U.S. Pat. Nos. 2,651,641; 2,723,279; 2,726,251; 2,777,863; 2,798,081; 2,827,356; 2,933,508 and 2,945,867.) Compounds of intermediate Formula III may be acylated with suitable reagents such as described by radicals 1'–9' to produce the corresponding colorants of Formula I having Q groups represented by radicals 1–9, above:

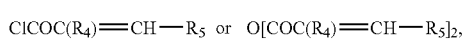

1'

2'

3'

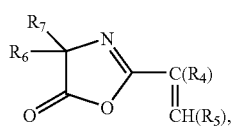

4'

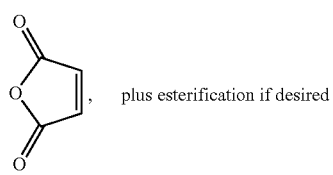

5'

, plus esterification if desired

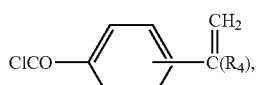

6'

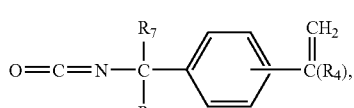

7'

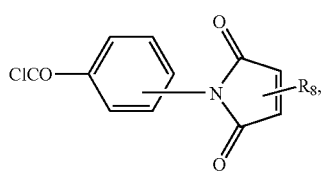

8'

-continued

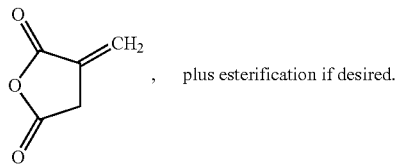

, plus esterification if desired.

In the case of radical 5' and 9', once Formula III has been acylated to provide the corresponding Q to the compound of Formula I, the appropriate $R_8$ group may be introduced by methods and procedures known to those of skill in the art.

Experimental

The following examples will illustrate further the colorants of the present invention.

EXAMPLE 1

A mixture of 1,5-dihydroxy-8-nitro4[-(3'-hydroxymethyl) anilino] anthraquinone (2.03 g, 0.005 mol, prepared as in EXAMPLE 37 of U.S. Pat. No. 2,777,863), 3-isopropenyl-α, α-dimethylbenzyl isocyanate (1.06 g, 0.005 mol), toluene (35 mL) and dibutyltin dilaurate (4 drops) was heated and stirred at 90° C. for 2.5 h. Heptane (50 mL) was added dropwise at about 35° C. with stirring. The dye was somewhat sticky and the organic layer was removed by decantation. Fresh heptane was added and the resulting solid was collected by filtration, washed with heptane and dried in air. Analysis by field desorption mass spectrometry supported the following structure:

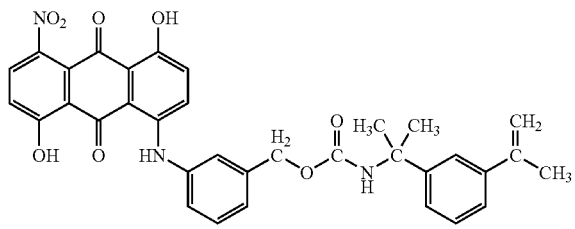

In the UV-visible light absorption spectrum in N,N-dimethylformamide (DMF), an absorption maximum was observed at 618 nm (extinction coefficient-15,728)

EXAMPLE 2

A mixture of 1,8-dihyroxy-5-nitro4-[3'-(1-hydroxyethyl) anilino]anthraquinone (2.10 g, 0.005 mol, prepared as on Example 2 of U.S. Pat. No. 2,651,641), 3-isopropenyl-α,α-dimethylbenzyl isocyanate (1.06 g, 0.005 mol), toluene (30 mL) and dibutyltin dilaurate (4 drops) was heated and stirred at 90° C. for 3 h. The blue colorant was precipitated by drowning into heptane (200 mL) with stirring and was collected by vacuum filtration, washed with heptane and dried in air (yield 3.1 g). Field desorption mass spectrometry supported the following structure:

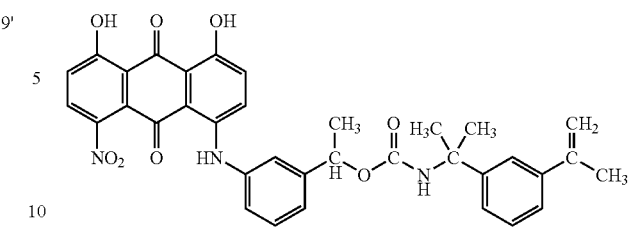

The UV-visible absorption spectrum in DMF showed an absorption maximum at 616 nm (extinction coefficient-12, 544).

EXAMPLE 3

A mixture of 1,8-dihydroxy-5-nitro-4-[4'-(2'-hydroxyethyl)anilino]anthraquinone (52.5 g, 0.125 mol), Example 1 of U.S. Pat. No. 2,641,602), 3-isopropenyl-α,α-dimethylbenzyl isocyanate (26.5 g, 0.125 mol), toluene (40 mL) and dibutyltin dilaurate (10 drops) was heated and stirred at 90° C. for 1.5 h. Thin layer chromatography (1:1 THF: cyclohexane) indicated incomplete reaction. Additional 3-isopropenyl-α,α-dimethylbenzyl isocyanate (5 g), toluene (50 mL) and dibutyltin dilaurate (5 drops) were added and heating continued for an additional 1.5 h. The reaction mixture was allowed to cool to about 60° C. and added to heptane (2.0 L) with stirring. The blue product was collected by vacuum filtration, washed with water and dried in air (yield-72.8 g).

Field desorption mass spectrometry supported the following structure:

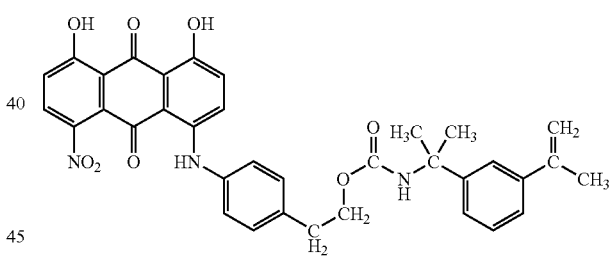

An absorption maximum was observed in the light absorption spectrum in DMF at 623 nm (extinction coefficient-15, 200).

EXAMPLE 4

To a 500 mL round bottomed flask equipped with a mechanical stirrer, heating mantle and Dean-Stark trap was added 1,8-dihydroxy-5-nitro-4-[4'-(2'-hydroxyethyl) anilino]-anthraquinone (25.0 g, 59.5 mmols) and 100 g of toluene. The mixture was stirred and heated to reflux to remove any water. Upon cooling to about 50° C., hydroquinone (50 mg), 4-dimethylaminopyridine (364 mg, 0.05 mole percent), triethylamine (6.63 g, 65.5 mmols) and methacrylic anhydride (10.10 g, 65.5 mmols) were added, respectively. The reaction mixture was stirred at reflux for 1.5 h at which time the reaction had gone to completion according to TLC (1:1 THF/Cyclohexane, $R_f$ (initial blue spot)=0.44, $R_f$ (final blue spot)=0.75). The reaction mixture was allowed to cool to room temperature then filtered to remove any insoluble material. The reaction mixture was washed twice with 100 mL of 0.25 M aqueous acetic acid solution followed by 200 mL of distilled water. The toluene-dye solution was added to a 500 mL round bottomed flask equipped with a heating mantle, mechanical stirrer and Dean-Stark trap then heated to reflux until all water had been removed. The toluene-dye solution was allowed to cool to room temperature then filtered to remove any insoluble material to give 146.13 g of the toluene-dye solution. An 8.86 g sample of the toluene-dye solution was concentrated using a rotary evaporator with a bath temperature of 80° C. and at a pressure of about 15 mm of Hg for about 1 h to give 1.58 g of blue dye as a sticky solid. The toluene solution was calculated to be 17.8 weight percent (wt %) dye. Where appropriate, the methacrylate-functional blue dye can be used as a toluene solution. Alternatively, the toluene can be replaced with appropriate polymerizable monomers such as hexanedioldiacrylate, tri(propyleneglycol)diacrylate and the like by any suitable means known to one skilled in the art. HPLC-Field desorption mass spectrometry supported the following structure:

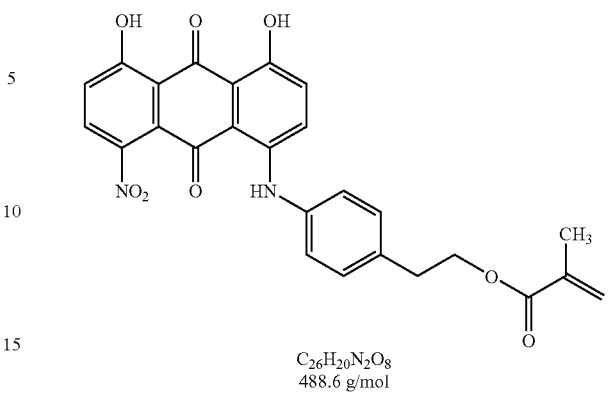

$C_{26}H_{20}N_2O_8$
488.6 g/mol

EXAMPLES 5–26

The colorants set forth in Table I were prepared according to the general method used to prepare the colorants of Examples 1 through 4. The colorants had the following general structure as further defined in Table I.

TABLE I

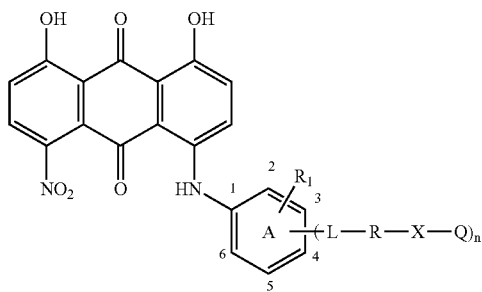

(Olefin functionalized 4-arylamino-1,8-dihydroxy-5-nitroanthraquinone colorants)

| Example | L | X | R | $R_1$ | n | Position of L on Ring A | Q |
|---|---|---|---|---|---|---|---|
| 5 | covalent bond | —O— | —CH$_2$— | H | 1 | 3 | —CONHC(CH$_3$)$_2$C$_6$H$_4$—3-C(CH$_3$)=CH$_2$ |
| 6 | " | " | " | 4-CH$_3$ | 2 | 3,5 | " |
| 7 | " | " | —CH(CH$_2$OQ)CH$_2$— | H | 1 | 4 | —CONHCOC(CH$_3$)=CH$_2$ |
| 8 | " | " | —CH$_2$OCH$_2$CH$_2$— | 4-CH$_3$ | 1 | 3 | —COC(CH$_3$)=CH$_2$ |
| 9 | " | " | —CHC(CH$_3$)CH$_2$— | 4 | 1 | 4 | " |
| 10 | " | " | —CH(CH$_3$)— | 2-Cl | 1 | 4 | " |
| 11 | " | " | —CO$_2$CH$_2$CH$_2$— | H | 1 | 3 | " |
| 12 | —NHCO— | " | —CH$_2$OCH$_2$CH$_2$— | 4-CH$_3$ | 2 | 3,5 | " |
| 13 | —N(COCH$_3$)— | " | —CH$_2$CH$_2$— | H | 1 | 4 | " |
| 14 | —SO$_2$— | " | —(CH$_2$)$_3$— | H | 1 | 4 | " |
| 15 | —S— | " | —(CH$_2$)$_4$— | H | 1 | 4 | " |
| 16 | —N(CH$_3$)CO— | " | —CH$_2$— | H | 1 | 4 | " |
| 17 | —O— | " | —CH$_2$CH$_2$—S—CH$_2$CH$_2$— | H | 1 | 4 | " |
| 18 | " | " | " | H | 1 | 4 | —CONHCOC(CH$_3$)=CH$_2$ |
| 19 | covalent bond | " | —CH$_2$— | 2-OCH$_3$ | 1 | 5 | —COC(CH$_3$)$_2$NHCOC(CH$_3$)=CH$_2$ |
| 20 | —O— | " | —CH$_2$CH$_2$OCH$_2$CH$_2$— | H | 1 | 4 | —CONHCH$_2$CH$_2$OCOCC(CH$_3$)=CH$_2$ |
| 21 | " | " | —(CH$_2$CH$_2$O)$_2$CH$_2$CH$_2$— | H | 1 | 4 | —COC(CH$_3$)$_2$NHCOC(CH$_3$)=CH$_2$ |
| 22 | covalent bond | —NH— | —CH$_2$CH$_2$— | H | 1 | 4 | —CONHC(CH$_3$)$_2$C$_6$H$_4$—3-C(CH$_3$)=CH$_2$ |
| 23 | " | —N(CH$_3$)— | " | H | 1 | 4 | —COCH=CH$_2$ |
| 24 | " | —O— | —(CH$_2$CH$_2$O)$_3$CH$_2$CH$_2$— | H | 1 | 4 | —COC(CH$_3$)=CH$_2$ |
| 25 | —N(SO$_2$CH$_3$)— | " | —CH$_2$CH$_2$— | H | 1 | 4 | —COCH=CHCO$_2$C$_2$H$_5$ |

TABLE I-continued (Olefin functionalized 4-arylamino-1,8-dihydroxy-5-nitroanthraquinone colorants)

| Example | L | X | R | R₁ | n | Position of L on Ring A | Q |
|---|---|---|---|---|---|---|---|
| 26 | —N(SO₂C₆H₅)— | " | —CH₂CH₂— | H | 1 | 3 | —CO—C₆H₄—N(maleimide) |

EXAMPLES 27–46

The colorants set forth in Table II were prepared according to the general method used to prepare the colorants of Examples 1 through 4. The colorants had the following general structure as further defined in Table II.

TABLE II (Olefin functionalized 4-arylamino-1,5-dihydroxy-8-nitroanthraquinone colorants)

| Example | L | X | R | R₁ | n | Position of L on Ring A | Q |
|---|---|---|---|---|---|---|---|
| 27 | covalent bond | —O— | —CH₂CH₂— | H | 1 | 4 | —C(O)NH—C(CH₃)₂—C₆H₄—C(CH₃)=CH₂ |
| 28 | " | " | " | H | 1 | 2 | " |
| 29 | " | " | —CH(CH₃)— | H | 1 | 3 | " |
| 30 | " | " | —CH₂— | 4-CH₃ | 2 | 3, 5 | " |
| 31 | " | " | —CH₂OCH₂CH₂— | 4-CH₃ | 2 | 3, 5 | " |
| 32 | —O— | " | —CH₂CH₂—SO₂—CH₂CH₂— | H | 1 | 4 | —CONHCH₂CH₂OCOCC(CH₃)=CH₂ |

TABLE II-continued

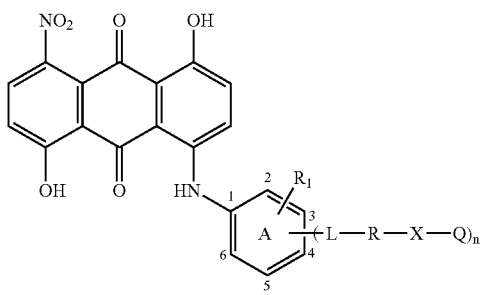

(Olefin functionalized 4-arylamino-1,5-dihydroxy-8-nitroanthraquinone colorants)

| Example | L | X | R | $R_1$ | n | Position of L on Ring A | Q |
|---|---|---|---|---|---|---|---|
| 33 | " | " | —CH$_2$CH$_2$—N(COCH$_3$)—CH$_2$CH$_2$— | H | 1 | 2 | —COC(CH$_3$)$_2$NHCOC(CH$_3$)=CH$_2$ |
| 34 | " | " | —CH$_2$CH$_2$OCH$_2$CH$_2$— | H | 1 | 4 | —CONHCOC(CH$_3$)=CH$_2$ |
| 35 | " | " | —(CH$_2$CH$_2$O)$_2$CH$_2$CH$_2$— | H | 1 | 4 | —COCH=CH$_2$ |
| 36 | " | " | —(CH$_2$CH$_2$O)$_3$CH$_2$CH$_2$— | H | 1 | 2 | —COC$_6$H$_4$-4-CH=CH$_2$ |
| 37 | " | " | —CH$_2$CH$_2$— | H | 2 | 2, 4 | —CO—C$_6$H$_4$—N(maleimide) |
| 38 | " | —NH— | —CH$_2$— | H | 1 | 4 | —COCH=CH—CO$_2$H |
| 39 | " | —N(C$_2$H$_5$)— | —CH$_2$CH$_2$— | H | 1 | 4 | —COCH=CH—C$_6$H$_5$ |
| 40 | " | —N(C$_6$H$_5$)— | —(CH$_2$)$_4$— | H | 1 | 4 | —COCH=CH-(2-furyl) |
| 41 | covalent bond | —O— | —CH$_2$—CH(CH$_3$)— |  | 1 | 4 | —COCH=CH-(2-thienyl) |
| 42 | —NHCO— | " | —CH$_2$— | H | 1 | 4 | —COCH$_2$C(CO$_2$CH$_3$)=CH$_2$ |
| 43 | —N(SO$_2$CH$_3$)— | " | —CH$_2$CH$_2$— | H | 1 | 3 | —COCH$_2$C(CO$_2$CH$_3$)=CH$_2$ |
| 44 | —S— | " | —CH$_2$CH$_2$— | H | 1 | 4 | " |
| 45 | covalent bond | " | —CH$_2$— | 2-OCH$_3$ | 1 | 5 | " |
| 46 | —SO$_2$— | " | —(CH$_2$)$_6$— | H | 1 | 4 | —CO—C$_6$H$_4$—N(3-methylmaleimide) |

As stated above, the present invention also relates to a process for making concentrated solutions of the blue colorants of the present invention in a suitable solvent. Suitable solvents include aromatics, ketones, acrylates, methacrylates, styrenes and the like. In the concentrates of the present invention, toluene, methylethyl ketone, acetone, hexanediol diacrylate, tri(propyleneglycol) diacrylate and mixtures thereof are preferred solvents. The concentration of dye in the solution can be from about 0.5 weight percent (wt %) to about 40 wt % and is preferably from about 10 wt % to about 30 wt %. The skilled artisan will understand that the foregoing ranges also include all fractions falling within these ranges, and that each of the lower ranges may be paired with the upper end ranges listed above.

In addition, the present invention also relates to a coating composition containing the colorants of Formula I. Such a coating composition would, for example, comprise (i) one or more polymerizable vinyl compounds, (ii) one or more colorant compounds described herein, and (iii) at least one photoinitiator. Preferred coating substrates are thermoplastics, glass, wood, metal, paper and the like, particularly preferred thermoplastics are polyesters, acrylics and polycarbonate.

The functionalized dyes, or colorants, produced herein that contain ethylenic unsaturations, or vinyl or substituted vinyl groups may be polymerized or copolymerized, which is preferably accomplished by free radical mechanisms, said free radicals being generated by exposure to UV light by methods known in the art of preparing UV-cured resins. Polymerization can be facilitated by the addition of photoinitiators. The colored polymeric materials normally are prepared by dissolving the functionalized colorants containing copolymerizable groups in a polymerizable vinyl monomer with or without another solvent and then combining with an oligomeric or polymeric material that contains one or more vinyl or substituted vinyl groups.

The polymerizable vinyl compounds useful in the present invention should contain at least one unsaturated group capable of undergoing polymerization upon exposure to UV radiation in the presence of a photoinitiator, i.e., the coating compositions are radiation-curable. Examples of such polymerizable vinyl compounds include acrylic acid, methacrylic acid and their anhydrides; crotonic acid; itaconic acid and its anhydride; cyanoacrylic acid and its esters; esters of acrylic and methacrylic acids such as allyl, methyl, ethyl, n-propyl, isopropyl, butyl, tetrahydrofurfuryl, cyclohexyl, isobornyl, n-hexyl, n-octyl, isooctyl, 2-ethylhexyl, lauryl, stearyl, and benzyl acrylate and methacrylate; and diacrylate and dimethacrylate esters of ethylene and propylene glycols, 1,3-butylene glycol, 1,4-butanediol, diethylene and dipropylene glycols, triethylene and tripropylene glycols, 1,6-hexanediol, neopentyl glycol, polyethylene glycol, and polypropylene glycol, ethoxylated bisphenol A, ethoxylated and propoxylated neopentyl glycol; triacrylate and trimethacrylate esters of tris-(2-hydroxyethyl)isocyanurate, trimethylolpropane, ethoxylated and propoxylated trimethylolpropane, pentaerythritol, glycerol, ethoxylated and propoxylated glycerol; tetraacrylate and tetramethacrylate esters of pentaerythritol and ethoxylated and propoxylated pentaerythritol; acrylonitrile; vinyl acetate; vinyl toluene; styrene; N-vinyl pyrrolidinone; alpha-methylstyrene; maleate/fumarate esters; maleic/fumaric acid; crotonate esters, and crotonic acid.

The polymerizable vinyl compounds useful in the present invention include polymers that contain unsaturated groups capable of undergoing polymerization upon exposure to UV radiation in the presence of a photoinitiator. The preparation and application of these polymerizable vinyl compounds are well known to those skilled in the art as described, for example, in *Chemistry and Technology of UV and EB Formulation for Coatings, Inks, and Paints*, Volume II: Prepolymers and Reactive Diluents, G. Webster, editor, John Wiley and Sons, London, 1997. Examples of such polymeric, polymerizable vinyl compounds include acrylated and methacrylated polyesters, acrylated and methacrylated polyethers, acrylated and methacrylated epoxy polymers, acrylated or methacrylated urethanes, acrylated or methacrylated polyacrylates (polymethacrylates), and unsaturated polyesters. The acrylated or methacrylated polymers and oligomers typically are combined with monomers which contain one or more acrylate or methacrylate groups, e.g., monomeric acrylate and methacrylate esters, and serve as reactive diluents. The unsaturated polyesters, which are prepared by standard polycondensation techniques known in the art, are most often combined with either styrene or other monomers, which contain one or more acrylate or methacrylate groups and serve as reactive diluents. A second embodiment for the utilization of unsaturated polyesters that is known to the art involves the combination of the unsaturated polyester with monomers that contain two or more vinyl ether groups or two or more vinyl ester groups (see, WO 96/01283, WO 97/48744, and EP 0 322 808).

The coating compositions of the present invention optionally may contain one or more added inert organic solvents if desired to facilitate application and coating of the compositions onto a substrate. Typical examples of suitable solvents include, but are not limited to, ketones, alcohols, esters, chlorinated hydrocarbons, glycol ethers, glycol esters, and mixtures thereof. Specific examples include, but are not limited to acetone, 2-butanone, 2-pentanone, ethyl acetate, propyl acetate, isopropyl acetate, butyl acetate, isobutyl acetate, ethylene glycol diacetate, ethyl 3-ethoxypropionate, methyl alcohol, ethyl alcohol, propyl alcohol, isopropyl alcohol, butyl alcohol, ethylene glycol, propylene glycol, ethylene glycol monomethyl ether, ethylene glycol monoethyl ether, ethylene glycol monopropyl ether, ethylene glycol monobutyl glycol, diethylene glycol monomethyl ether, diethylene glycol monoethyl ether, diethylene glycol monobutyl ether, propylene glycol monomethyl ether, diethylene glycol monobutyl ether acetate, diethylene glycol monoethyl ether acetate, ethylene glycol monobutyl ether acetate, propylene glycol monomethyl ether acetate, methylene chloride, chloroform, and mixtures thereof. The amount of added or extraneous solvent which may be present in our novel coating compositions may be in the range of about 1 to about 40 wt %, more typically about 1 to about 25 wt %, based on the total weight of the coating composition.

Certain polymerizable vinyl monomers may serve as both reactant and solvent. These contain at least one unsaturated group capable of undergoing polymerization upon exposure to UV radiation in the presence of a photoinitiator. Specific examples include, but are not limited to: methacrylic acid, acrylic acid, ethyl acrylate and methacrylate, methyl acrylate and methacrylate, hydroxyethyl acrylate and methacrylate, diethylene glycol diacrylate, trimethylolpropane triacrylate, 1,6 hexanediol di(meth)acrylate, neopentyl glycol diacrylate and methacrylate, vinyl ethers, divinyl ethers such as diethyleneglycol divinyl ether, 1,6-hexanediol divinyl ether, cyclohexanedimethanol divinyl ether, 1,4-butanediol divinyl ether, triethyleneglycol divinyl ether, trimethylolpropane divinyl ether, and neopentyl glycol divinyl ether, vinyl esters, divinyl esters such as divinyl adipate, divinyl succinate, divinyl glutarate, divinyl 1,4-cyclohexanedicarboxylate, divinyl 1,3-cyclohexanedicarboxylate, divinyl isophthalate, and divinyl terephthalate, N-vinyl pyrrolidone, and mixtures thereof.

In addition, the compositions of the present invention may be dispersed in water rather than dissolved in a solvent to facilitate application and coating of the substrate surface. In the water-dispersed compositions of the present invention a co-solvent may be optionally used. Typical examples of suitable cosolvents include but are not limited to acetone, 2-butanone, methanol, ethanol, isopropyl alcohol, ethylene glycol monomethyl ether, ethylene glycol monoethyl ether, ethylene glycol monopropyl ether, and ethylene glycol monobutyl ether, ethylene glycol, and propylene glycol. Typical examples of water-soluble ethylenically unsaturated solvents include but are not limited to: methacrylic acid, acrylic acid, N-vinyl pyrrolidone, 2-ethoxyethyl acrylate and methacrylate, polyethylene glycol dimethacrylate, polypropylene glycol monoacrylate and monomethacrylate, and mixtures thereof. The amount of suitable aqueous organic solvent (i.e., organic solvent and water) in the dispersed coating compositions of the present invention is about 10 to about 90 wt %, preferably about 75 to about 90 wt % of the total coating composition.

The coating compositions of the present invention contain one or more of the reactive vinyl dye compounds described herein. The concentration of the dye compound or compounds may be from about 0.005 to about 30.0, preferably from about 0.5 to about 25, wt % based on the weight of the polymerizable vinyl compound(s) present in the coating composition, i.e., component (i) of the coating compositions. The coating compositions of the present invention normally contain a photoinitiator. The amount of photoinitiator typically is about 1 to 15 wt %, preferably about 3 to about 5 wt %, based on the weight of the polymerizable vinyl compound(s) present in the coating composition. Typical photoinitiators include benzoin and benzoin ethers such as marketed under the tradenames ESACURE BO, EB1, EB3, and EB4 from Fratelli Lamberti; VICURE 10 and 30 from Stauffer; benzil ketals such as 2,2-dimethoxy-1,2-diphenylethan-1-one (IRGACURE 651), 2-hydroxy-2-methyl-1-phenylpropan-1-one (IRGACURE 1173), 2-methyl-2-morpholino-1-(p-methylthiophenyl)propan-1-one (IRGACURE 907), alpha-hydroxyalkyl-phenones such as (1-hydroxycyclohexyl)(phenyl)-methanone (IRGACURE 184), 2-benzyl-2-(dimethylamino)-1-(4-morpholino-phenyl)butan-1-one (IRGACURE 369), 2-hydroxy-2-methyl-1-phenylpropan-1-one IRGACURE 1173) from Ciba Geigy, Uvatone 8302 by Upjohn; alpha, alpha-dialkoxyacetophenone derivatives such as DEAP and UVATONE 8301 from Upjohn; DAROCUR 116, 1173, and 2959 by Merck; and mixtures of benzophenone and tertiary amines In pigmented coating compositions, the rate of cure can be improved by the addition of a variety of phosphine oxide photoinitiaters such as bis(2,4,6-trimethylbenzoyl)-phenyl-phosphine oxide (Irganox 819), Irgacure 819, 1700, and 1700 and phosphine oxide mixtures such as a 50/50 by weight mixtures of IRGACURE 1173 and 2,4,6-trimethylbenzoyldiphenylphosphine oxide (DAROCUR 4265) from Ciba. Further details regarding such photoinitiators and curing procedures may be found in the published literature such as U.S. Pat. No. 5,109,097, incorporated herein by reference. Depending upon the thickness of the coating (film), product formulation, photoinitiator type, radiation flux, and source of radiation, exposure times to ultraviolet radiation of about 0.5 second to about 30 minutes (50–5000 mJ/square cm) typically are required for curing. Curing also can occur from solar radiation, i.e., sunshine.

The coating compositions of the present invention may contain one or more additional components typically present in coating compositions. Examples of such additional components include leveling, rheology, and flow control agents such as silicones, fluorocarbons or cellulosics; flatting agents; pigment wetting and dispersing agents; surfactants; ultraviolet (UV) absorbers; UV light stabilizers; tinting pigments; defoaming and antifoaming agents; anti-settling, anti-sag and bodying agents; anti-skinning agents; anti-flooding and anti-floating agents; fungicides and mildewcides; corrosion inhibitors; thickening agents; and/or coalescing agents. The coating compositions of the present invention also may contain non-reactive modifying resins. Typical non-reactive modifying resins include homopolymers and copolymers of acrylic and methacrylic acid; homopolymers and copolymers of alkyl esters of acrylic and methacrylic acid such as methyl, ethyl, n-propyl, isopropyl, butyl, tetrahydrofurfuryl, cyclohexyl, isobornyl, n-hexyl, n-octyl, isooctyl, 2-ethylhexyl, lauryl, stearyl, and benzyl acrylate and methacrylate; acrylated and methacrylated urethane, epoxy, and polyester resins, silicone acrylates, cellulose esters such as cellulose acetate butyrates, cellulose acetate, propionates, nitrocellulose, cellulose ethers such as methyl cellulose, ethyl cellulose, hydroxypropyl cellulose, and hydroxypropyl methyl cellulose. Typical plasticizers include alkyl esters of phthalic acid such as dimethyl phthalate, diethyl phthalate, dipropyl phthalate, dibutyl phthalate, and dioctyl phthalate; citrate esters such as triethyl citrate and tributyl citrate; triacetin and tripropionin; and glycerol monoesters such as Eastman 18-04, 18-07, 18-92 and 18-99 from Eastman Chemical Company. Specific examples of additional additives can be found in *Raw Materials Index*, published by the National Paint & Coatings Association, 1500 Rhode Island Avenue, N.W., Washington, D.C. 20005.

The polymeric coatings of the present invention typically have a solvent resistance of at least 100 MEK double rubs using ASTM Procedure D-3732; preferably a solvent resistance of at least about 200 double rubs. Such coatings also typically have a pencil hardness of greater than or equal to F using ASTM Procedure D-3363; preferably a pencil hardness of greater than or equal to H. The coating compositions can be applied to substrates with conventional coating equipment. The coated substrates are then exposed to radiation such as ultraviolet light in air or in nitrogen which gives a cured finish. Mercury vapor or Xenon lamps are applicable for the curing process. The coatings of the present invention can also be cured by electron beam.

The radiation-curable coating compositions of this invention are suitable as adhesives and coatings for such substrates as metals such as aluminum and steel, plastics, glass, wood, paper, and leather. On wood substrates the coating compositions may provide both overall transparent color and grain definition. Various aesthetically-appealing effects can be achieved thereby. Due to reduced grain raising and higher film thicknesses, the number of necessary sanding steps in producing a finished wood coating may be reduced when using the colored coating compositions of the invention rather than conventional stains. Coating compositions within the scope of our invention may be applied to automotive base coats where they can provide various aesthetically-appealing effects in combination with the base coats and color differences dependent on viewing angle (lower angles create longer path lengths and thus higher observed color intensities). This may provide similar styling effects as currently are achieved with metal flake orientation in base coats. Coating compositions within the scope of our invention may be applied to window films that may be suitable for automotive and architectural applications. Coating compositions within the scope of our invention may be applied to glass such as a fiber optic cable.

Various additional pigments, plasticizers, and stabilizers may be incorporated to obtain certain desired characteristics in the finished products. These are included in the scope of the invention.

Coating, Curing, and Testing Procedures:

Samples of formulations were used to coat glass plates, aluminum plates, rolled steel and Spectar®, a polyester from Eastman Chemical Company (Kingsport, Tenn.), using a wire-wound bar. The wet film thickness was from about 4 to 10 microns (0.6 to 3.0 mils). Prior to exposure to UV radiation, each film was readily soluble in organic solvents.

The film on the specified substrate was exposed to UV radiation from a 200 watt per inch medium pressure mercury vapor lamp housed in an American Ultraviolet Company instrument using a belt speed of 24 ft. per minute. One to four passes under the lamp resulted in a crosslinked coating with maximum hardness and solvent resistance.

Each cured coating (film) may be evaluated for Konig Pendulum Hardness (ASTM D4366 DIN 1522) and solvent resistance by the methyl ethyl ketone double-rub test. The damping time for Konig Pendulum Hardness on uncoated glass is 250 seconds; coatings with hardness above 100 seconds are generally considered hard coatings. The methyl ethyl ketone (MEK) double rub test is carried out in accordance with ASTM Procedure D-3732 by saturating a piece of cheese cloth with methyl ethyl ketone, and with moderate pressure, rubbing the coating back and forth. The number of double rubs is counted until the coating is removed. The acetone solubility test is carried out by immersing a dry, pre-weighed sample of the cured film in acetone for 48 hours at 25° C. The film is removed, dried for 16 hours at 60° C. in a forced-air oven, and reweighed. The wt % of the insoluble film remaining is calculated from the data.

COATING EXAMPLES

The coatings and coating compositions provided by the present invention and the preparation thereof are further illustrated by the following examples.

EXAMPLE 47

A photopolymerizable composition consisting of 8.09 g Jägalux UV1500 polyester acrylate, 3.96 g of bisphenol A epoxy acrylate, 3.58 g dipropyleneglycol diacrylate (DPGDA), 2.83 g trimethylolpropane triacrylate (TMPTA), and 1.06 g of Darocure 1173 photoinitiator until the components were completely dispersed. The resulting coating composition was drawn down with a wire wound rod to provide a 4–10 micron thick wet coating on a 4"×4" glass plate, 4"×4" Spectar® plaque, 3"×6" aluminum plate and a 3"×6" rolled steel plate. Each panel was passed through a UV cure machine at a speed of 7.3 meters per minute (24 feet/minute) using a lamp with an intensity of 118.1 watts per cm (300 watts per inch). Konig Pendulum Hardness measurements (ASTM D4366 DIN 1522) were conducted on the each coated substrate and indicated a hard coating was obtained (Table III). Chemical resistance was tested with MEK double rubs. The coating withstood more than 300 MEK double rubs.

EXAMPLE 48

A colored, photopolymerizable composition was prepared by thoroughly mixing 0.2 g the blue dye of EXAMPLE 3 with a coating composition consisting of 8.89 g Jägalux UV1500 polyester acrylate, 4.25 g of bisphenol A epoxy acrylate, 3.62 g dipropyleneglycol diacrylate (DPGDA), 2.83 g trimethylolpropane triacrylate (TMPTA), and 1.01 g of Darocure 1173 photoinitiator until the components were completely dispersed. The resulting coating composition containing approximately 1% of the blue dye was drawn down with a wire wound rod to provide a 4–10 micron thick wet coating on a 4"×4" glass plate, 4"×4" Spectar® plaque, 3"×6" aluminum plate and a 3"×6" rolled steel plate. Each panel was passed through a UV cure machine at a speed of 7.3 meters per minute (24 feet/minute) using a lamp with an intensity of 118.1 watts per cm (300 watts per inch). Konig Pendulum Hardness measurements (ASTM D4366 DIN 1522) were conducted on the each coated substrate and indicated no significant loss of hardness due to incorporation of the dye (Table III). It is interesting to note the coating containing the dye on a glass panel was found to be harder than the control, Example 51 and Example 55. Chemical resistance was tested with MEK double rubs. Both the reference, which contained no polymerizable dye, and the coatings, which contained polymerizable dyes, withstood more than 300 MEK double rubs. No dye color was observed on the white cheesecloth of the MEK rub test, which is an indication that the dyes cannot be extracted from the coatings with solvents and demonstrates complete incorporation of the dye into the polymer matrix of the cured film.

EXAMPLE 49

A colored, photopolymerizable composition was prepared by thoroughly mixing 1.15 g the blue dye of Example 4 with a coating composition consisting of 7.98 g Jägalux UV1500 polyester acrylate, 4.08 g of bisphenol A epoxy acrylate, 3.69 g dipropyleneglycol diacrylate (DPGDA), 2.84 g trimethylolpropane triacrylate (TMPTA), and 1.01 g of Darocure 1173 photoinitiator until the components were completely dispersed. The resulting coating composition containing approximately 1% of the blue dye was drawn down with a wire wound rod to provide a 4–10 micron thick wet coating on a 4"×4" glass plate, 4"×4" Spectar® plaque, 3"×6" aluminum plate and a 3"×6" rolled steel plate. Each panel was passed through a UV cure machine at a speed of 7.3 meters per minute (24 feet/minute) using a lamp with an intensity of 118.1 watts per cm (300 watts per inch). Konig Pendulum Hardness measurements (ASTM D4366 DIN 1522) were conducted on the each coated substrate and indicated no significant loss of hardness due to incorporation of the dye (Table III). It is interesting to note the coating containing the dye on a glass panel was found to be harder than the control, Example 51 and Example 59. Chemical resistance was tested with MEK double rubs. Both the reference, which contained no polymerizable dye, and the coatings, which contained polymerizable dyes, withstood more than 300 MEK double rubs. No dye color was observed on the white cheesecloth of the MEK rub test, which is an indication that the dyes cannot be extracted from the coatings with solvents and demonstrates complete incorporation of the dye into the polymer matrix of the cured film.

EXAMPLE 50–61

Examples 50 through 61, which are set forth in Table III, reflect Konig Pendulum Hardness measurements for various coated substrates using the coatings in Examples 47 through 49.

TABLE III (Konig Pendulum Hardness measurement for coated substrate)

| Example # | Substrate | Coating | Trial 1 | Trial 2 |
|---|---|---|---|---|
| 50 | aluminum | Example 47 | 227 | 236 |
| 51 | glass | Example 47 | 107 | 103 |
| 52 | rolled steel | Example 47 | 206 | 206 |
| 53 | Spectar ® | Example 47 | 241 | 242 |
| 54 | aluminum | Example 48 | 230 | 225 |
| 55 | glass | Example 48 | 183 | 162 |
| 56 | rolled steel | Example 48 | 207 | 203 |
| 57 | Spectar ® | Example 48 | 240 | 241 |
| 58 | aluminum | Example 49 | 229 | 237 |
| 59 | glass | Example 49 | 136 | 146 |
| 60 | rolled steel | Example 49 | 197 | 213 |
| 61 | Spectar ® | Example 49 | 237 | 223 |

The invention has been described in detail with particular reference to preferred embodiments thereof, but it will be understood that variations and modifications can be effected within the spirit and scope of the invention.

What is claimed is:

1. An anthraquinone colorant having the structure in Formula I:

I

[Structure showing anthraquinone with OH, OH, NO$_2$ substituents and HN—phenyl-R$_1$ group with —(L—R—X—Q)$_n$ substituent]

wherein
- L is a covalent carbon-carbon bond or a linking group selected from the group consisting of —O—, —S—, —SO$_2$—, —CON(R$_2$)—, —N(COR$_3$)—, —N(R$_2$)CO—, and —N(SO$_2$R$_3$)—;
- R is a divalent organic radical selected from the group consisting of C$_1$–C$_6$-alkylene; C$_1$–C$_6$-alkylene-Y—CH$_2$CH$_2$—; and —(CH$_2$CH$_2$)$_m$—Y—CH$_2$CH$_2$—;
- R$_1$ is hydrogen or represents one or two groups selected from the group consisting of C$_1$–C$_6$-alkyl, C$_1$–C$_6$-alkoxy and halogen.
- R$_2$ is hydrogen, C$_1$–C$_6$-alkyl, C$_3$–C$_8$-cycloalkyl or aryl;
- R$_3$ is C$_1$–C$_6$-alkyl, C$_3$–C$_8$-cycloalkyl or aryl;
- X is —O— or —N(R$_2$)—;
- Y is —O—, —S—, —SO$_2$—, —N(SO$_2$R$_3$)—, or —N(COR$_3$)—;
- n is 1 or 2;
- m is 2 or 3; and
- Q is

—COC(R$_4$)=CH—R$_5$,                                                 1

—CONHCOC(R$_4$)=CH—R$_5$,                                        2

—CONH—C$_1$–C$_6$-alkylene-OCOC(R$_4$)=CH—R$_5$,     3

—COC(R$_6$)(R$_7$)—NHCOC(R$_4$)=C(H)—R$_5$,                  4

—COCH=CH—CO$_2$R$_8$,                                                5

—CO—phenyl—C(R$_4$)=CH$_2$,                                         6

—CONH—C(R$_7$)(R$_6$)—phenyl—C(R$_4$)=CH$_2$,                7

—CO—phenyl—N(maleimide-R$_9$), or                                8

—COCH$_2$CCO$_2$R$_8$ (=CH$_2$) and/or —COCCH$_2$CO$_2$R$_8$ (=CH$_2$),  9 wherein:
- R$_4$ is hydrogen or C$_1$–C$_6$-alkyl;
- R$_5$ is hydrogen; C$_1$–C$_6$ alkyl; phenyl; phenyl substituted with one or more groups selected from the group consisting of C$_1$–C$_6$-alkyl, C$_1$–C$_6$-alkoxy, —N(C$_1$–C$_6$-alkyl)$_2$, nitro, cyano, C$_1$–C$_6$-alkoxycarbonyl, C$_1$–C$_6$-alkanoyloxy and halogen; 1- or 2-naphthyl; 1- or 2-naphthyl substituted with C$_1$–C$_6$-alkyl or C$_1$–C$_6$-alkoxy; 2- or 3-thienyl; 2- or 3-thienyl substituted with C$_1$–C$_6$-alkyl or halogen; 2- or 3-furyl; or 2- or 3-furyl substituted with C$_1$–C$_6$-alkyl;
- R$_6$ and R$_7$ are, independently, hydrogen, C$_1$–C$_6$-alkyl, or aryl; or R$_6$ and R$_7$ may be combined to represent a —(CH$_2$)$_{3-5}$ radical;
- R$_8$ is hydrogen, C$_1$–C$_6$-alkyl, C$_1$–C$_8$-alkenyl, C$_3$–C$_8$-cycloalkyl or aryl; and
- R$_9$ is hydrogen, C$_1$–C$_6$-alkyl or aryl.

2. A colorant according to claim 1, wherein R is C$_1$–C$_4$-alkylene, R$_1$ is hydrogen, L is —O— or a covalent bond, X is —O—, and Q is —CONH—C(R$_6$)(R$_7$)—phenyl—C(R$_4$)=CH$_2$, wherein R$_4$ is hydrogen or methyl, R$_6$ and R$_7$ are methyl, and n is 1.

3. A colorant according to claim 1, wherein R is C$_1$–C$_4$-alkylene, R$_1$ is hydrogen, L is —O— or a covalent bond, X is —O—, and Q is —COC(R$_4$)=CH—R$_5$, wherein R$_4$ is hydrogen or methyl, R$_5$ is hydrogen, and n is 1.

4. A colorant according to claim 1 having the structure

[Structure of anthraquinone derivative with NO$_2$, OH, OH substituents, HN-phenyl-CH$_2$-O-C(O)-NH-C(CH$_3$)(CH$_3$)-phenyl-C(CH$_2$)=CH$_3$ group]

5. A colorant according to claim 1 having the structure

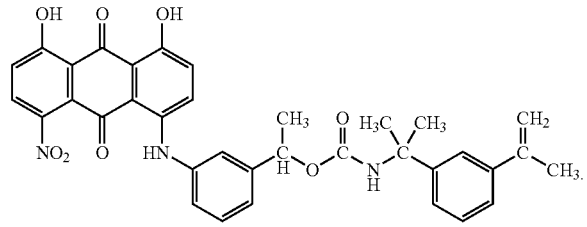

6. A colorant according to claim 1 having the structure

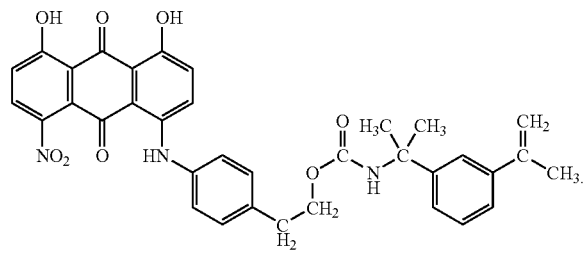

7. A colorant according to claim 1 having the structure

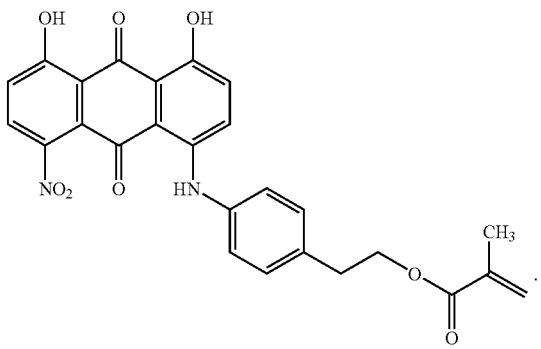

8. A colorant concentrate comprising a solvent and a colorant according to claim 1 at a concentration of about 0.5 to about 40 wt %.

9. A colorant concentrate according to claim 8 wherein the solvent is toluene, methylethyl ketone, acetone, hexanediol diacrylate, tri(propyleneglycol) diacrylate or a mixture thereof and the colorant is present at a concentration of about 10 to about 30 wt %.

10. A colorant concentrate according to claim 9 further comprising one or more ultraviolet light absorbing compounds at a concentration of from about 0.1 to about 30 wt %.

11. A colorant concentrate according to claim 9 further comprising one or more antioxidants at a concentration of about 0.01 to about 5 wt %.

* * * * *